United States Patent [19]

Oldfather et al.

[11] Patent Number: 4,822,094
[45] Date of Patent: Apr. 18, 1989

[54] TRACTOR SEAT SUSPENSION MECHANISM WITH AUTOMATIC SEAT STOP

[75] Inventors: Raymond L. Oldfather, Woodridge; Robert J. Oliver, Westmont, both of Ill.

[73] Assignee: J. I. Case Company, Racine, Wis.

[21] Appl. No.: 142,935

[22] Filed: Jan. 12, 1988

[51] Int. Cl.[4] .............................................. B60N 1/02
[52] U.S. Cl. .................................. 296/65.1; 248/421; 248/561; 248/573; 297/345
[58] Field of Search ............. 296/65 R; 248/421, 423, 248/631, 563, 561, 573, 574; 297/334, 345, 347, 339

[56] References Cited

U.S. PATENT DOCUMENTS

| | | | |
|---|---|---|---|
| 3,218,020 | 11/1965 | Rhodes | 248/631 X |
| 3,325,136 | 6/1967 | Radke et al. | 248/631 X |
| 3,883,172 | 5/1975 | Barton et al. | 296/65 R |
| 3,954,245 | 5/1976 | Costin | 248/631 X |
| 4,148,518 | 4/1979 | Vilbeuf | 296/65 R |
| 4,461,444 | 7/1984 | Grassel et al. | 248/631 X |
| 4,626,018 | 12/1986 | Massey | 246/65 R |
| 4,690,388 | 9/1987 | Harrison | 248/631 X |

OTHER PUBLICATIONS

4994 *Tractor Parts Catalogue,* J. I. Case Company, Title Page and pp. 9-380, 9-381, 9-382, 9-383; Mar. 1985.

*Primary Examiner*—Robert B. Reeves
*Assistant Examiner*—Brian Sells
*Attorney, Agent, or Firm*—Dressler, Goldsmith, Shore, Sutker & Milnamow, Ltd.

[57] ABSTRACT

A seat suspension mechanism providing a vertical range of cushion travel to a tractor seat when fluid is supplied to the mechanism. The suspension mechanism includes a linkage assembly movable through a predetermined path of travel for securing the seat to the frame and a damper assembly operable in combination with the linkage assembly for regulating the cushion travel of the seat. The present invention further includes an automatic seat stop mechanism connectable to the suspension mechanism for limiting the movement of the linkage assembly and the seat upon cessation or interruption of fluid flow to the seat suspension mechanism.

7 Claims, 2 Drawing Sheets

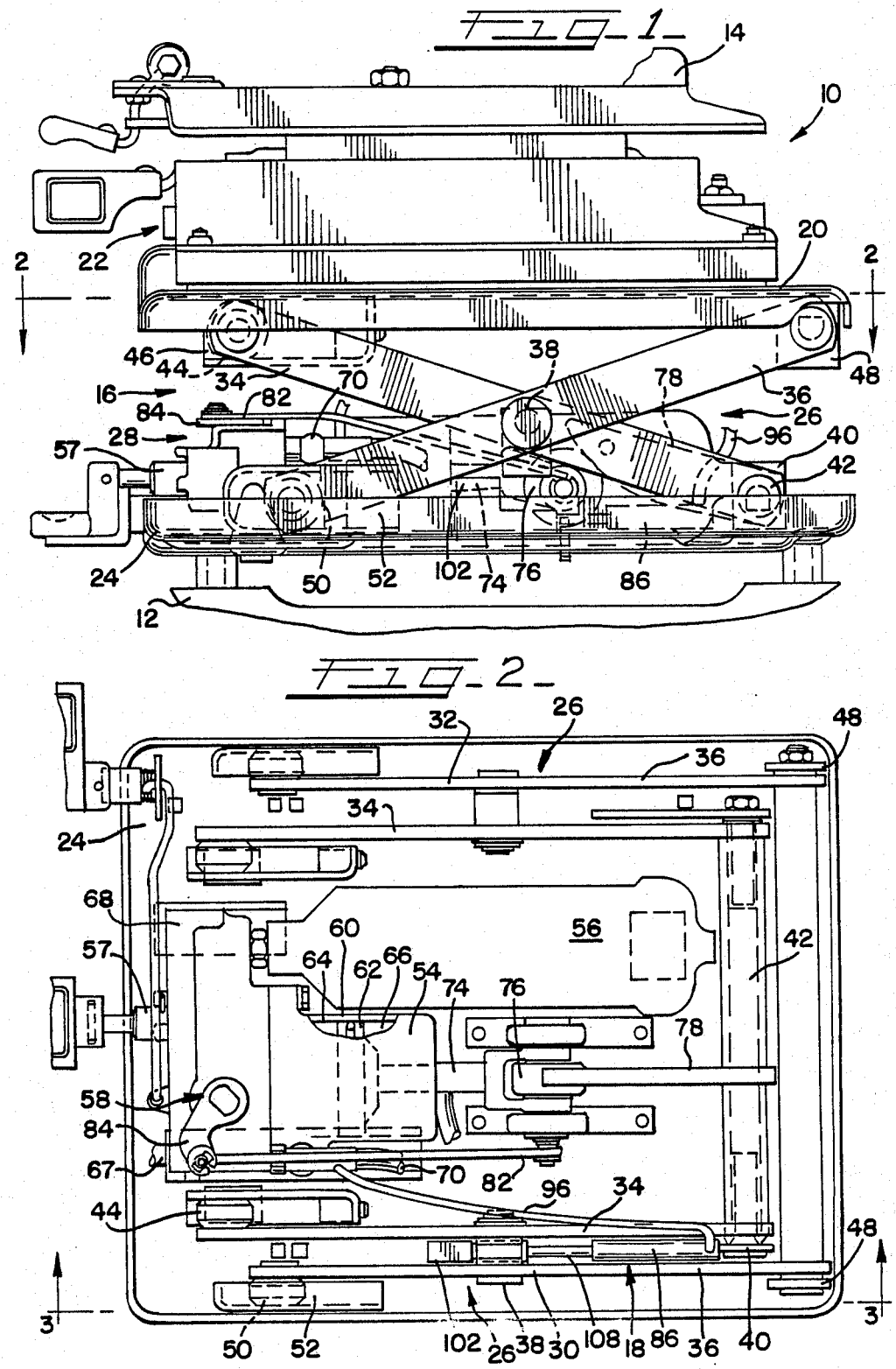

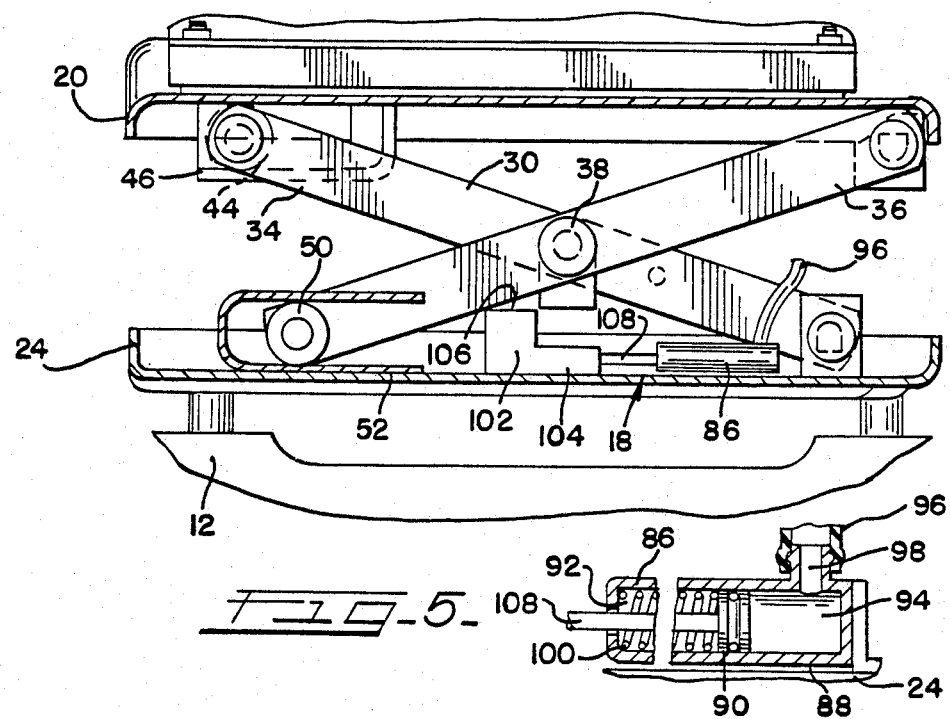
FIG-3
FIG-5
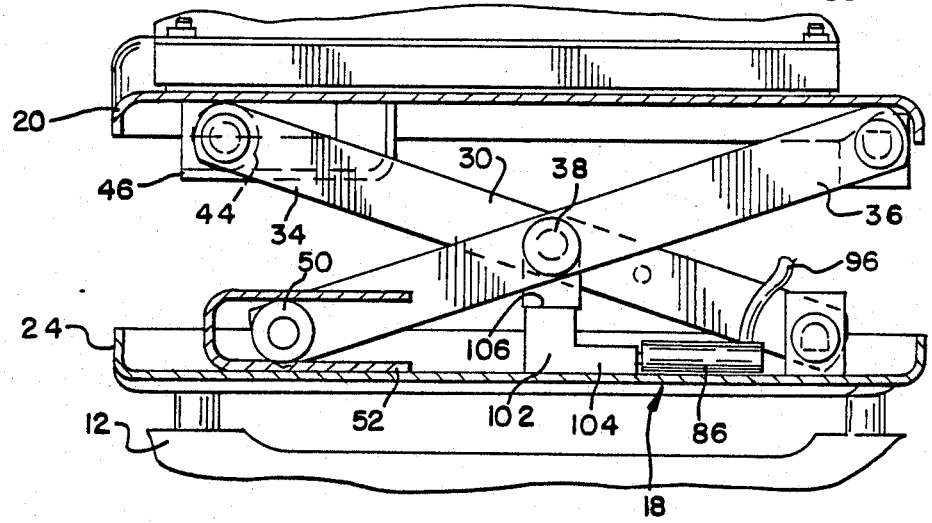
FIG-4

TRACTOR SEAT SUSPENSION MECHANISM WITH AUTOMATIC SEAT STOP

FIELD OF THE INVENTION

This invention relates to seat assemblies for tractors and the like and, more particularly, to a seat suspension mechanism having an automatic seat stop for limiting seat travel.

BACKGROUND OF THE INVENTION

Unlike automobiles, most agricultural tractors and other off-road equipment have substantially no wheel or cab suspension mechanisms for comforting the ride over rough terrain. To comfort a tractor operator's ride, various seat suspension systems have been devised for providing vertical cushioned movement of an operator's seat. These systems need a large range of available seat travel for accommodating many different operators. The seat suspension system also needs to provide a large range of cushioned seat movement for travel over rough or rugged terrain.

Pressurized oil and/or air cushioned seats have been used in off-road equipment. Such seats are designed as weight and height adjustable seats which provide a large degree of seat travel. In operation, these seats usually sense the weight on the seat and adjust the seat height to midstroke of its vertical travel. This permits use of the full stroke of the suspension during operation over rough terrain.

Although they afford a cushioned ride for the operator, such seats also have drawbacks. When the operator is not on the seat, the seat mechanism will adjust for a light operator and when fluid flow to the seat is interrupted or stopped, the seat sinks or falls to the extreme lowest position of its travel. When the seat sinks to its extreme lowest position, it is in a position much too low to allow for tractor operation and is ergonomically uncomfortable.

A simple solution to this problem would appear to be raising the lowermost suspension position of the seat. Albeit attractive, raising the lowermost suspension position of the seat likewise raises the uppermost travel limit of the seat if the desired range of travel is to be provided. Because such seats are usually contained with a hooded cab enclosure, raising the upward travel limit of the seat may require designing the tractor cab roof with sufficient spacing to prevent an operator from striking his head on the roof of the tractor cab. As may be readily appreciated, extending a tractor cab roof to a height higher than necessary can be a costly proposition. Moreover, raising the lowermost suspension position of the seat may also result in a conflict with S.A.E. standards. That is, S.A.E. sets a prescribed "seat indication point" range which governs how far above the tractor cab flooring the operator seat is to be arranged when the seat is positioned midstroke of its travel. Besides raising the upward travel limit of the seat, raising the lowermost suspension position of the seat would adversely move the midstroke position of the seat beyond the "seat indication point" range prescribed by S.A.E. standards.

Until now, no one has conceived of a simple solution to the problem. That is, no known seat arrangement has been designed in a manner which satisfies all of the above requirements. No known seat arrangement provides a unique combination of a large range of cushioned seat travel within S.A.E. standards and that will not assume a position too low for operation when the fluid flow thereto is interrupted or stopped.

SUMMARY OF THE INVENTION

In view of the above, the present invention contemplates a seat suspension mechanism that provides a large cushioned travel within S.A.E. standards and that is designed to prevent the seat from falling beneath a predetermined level or height when fluid flow to the suspension mechanism is interrupted or stopped. To effect these ends, the invention generally includes a fluid powered seat suspension mechanism and a seat stop for limiting the range of movement of the seat upon interruption of fluid flow to the suspension mechanism.

The seat suspension mechanism includes a linkage assembly movable along a predetermined path for securing the seat to the frame of an agricultural tractor or the like. In the disclosed embodiment, a cammed member follows the linkage assembly and combines with a fluid damper for regulating seat suspension over a large range of cushioned travel. The fluid damper permits use of the full stroke of the linkage assembly during operation over rough terrain. The fluid damper is connectable and responsive to a fluid supply source and includes, in combination, a fluid driver and an accumulator which are connectable through a fluid flow valve assembly which automatically adjusts the seat to midstroke. The flow through the valve assembly is regulated as a function of seat disposition.

A salient feature of this invention involves the provision of an automatic seat stop mechanism which permits a full range of cushioned seat travel when fluid flow is delivered to the seat mechanism. When fluid flow to the suspension mechanism is interrupted or stopped, the seat stop means is effective to limit seat travel beneath a predetermined height. To accomplish these ends, the seat stop mechanism is responsive to operation of the seat suspension mechanism. More specifically, the seat stop assembly includes a driven limit stop movable in response to fluid flow to the suspension mechanism.

In operation, the limit stop remains out of the path of the linkage means when fluid flow is supplied to the suspension mechanism so as to allow a full range of cushioned movement of the seat. The limit stop is automatically moved into the path of the linkage means upon cessation or interruption of fluid flow to the suspension mechanism. When moved into the path of the linkage means, the stop is positioned such that it stops the seat at a point above its lowermost suspension position. As such, the operator's seat is positioned such that the operator, upon reentering, is provided with an operational view from the seat even after the tractor and seat suspension mechanism have been shut down. Moreover, limiting seat travel to a point above the seat's lowermost suspension position is ergonomically beneficial to an operator reentering the seat after the tractor has been shut down.

Other features and advantages of the present invention will become readily apparent from the following detailed description, the appended drawings, and the accompanying claims.

BRIEF DESCRIPTION OF THE DRAWINGS

FIG. 1 is a side elevational view of a seat assembly embodying the principles of the present invention;

FIG. 2 is a top plan view of the seat assembly of FIG. 1 taken along line 2—2 of FIG. 1;

FIG. 3 is a side elevational view taken along line 3—3 of FIG. 2 and illustrating the present seat stop mechanism in an inoperative position;

FIG. 4 is a side elevational view similar to FIG. 3 illustrating the seat stop mechanism in an operative position; and FIG. 5 is a longitudinal sectional view of a portion of the seat stop mechanism.

DETAILED DESCRIPTION OF A PREFERRED EMBODIMENT

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring now to the drawings, wherein like reference numerals indicate like parts throughout the several views, there is shown a seat assembly 10 which is connectable to an agricultural tractor 12 or the like. The seat assembly 10 includes an operator's seat 14, a seat suspension mechanism 16, and an automatic seat stop mechanism 18.

As best illustrated in FIG. 1, the operator's seat may be connected to a top platform or housing 20 through a seat swivel mechanism 22. In that the seat swivel mechanism 22 forms no part of this invention, no further description need be provided therefor. A bottom platform or housing 24 serves as a lower support for the seat assembly 10.

The seat suspension mechanism 16 connects the operator's seat to the tractor while permitting reciprocal movement thereof along a substantially vertical path. As best illustrated in FIG. 2, the seat suspension mechanism 16 includes pivotal linkage assembly means 26 and damper means 28 arranged in combination to provide a vertical range of cushioned travel for the seat in response to a fluid flow to the suspension mechanism.

In its preferred form, the linkage means 26 includes two sets or pairs of support linkages 30 and 32 movable through predetermined paths and arranged on opposite sides of seat 14. For purposes of the present disclosure, reference will be made to linkage 30 in describing the presently preferred construction thereof, with the understanding that the other linkage may be of similar construction. As illustrated in FIG. 1, linkage 30 includes a pair of links 34 and 36 each movable along a predetermined path and which are connected at a pivot 38 to establish a scissor-like linkage. At one end, link 34 is pivotally connected to a support block 40 fixedly carried by housing 24. As illustrated in FIG. 2, such pivotal connection may include a rotatable shaft 42 whose angular disposition changes as a function of the angular disposition of link 34 and, thereby, the height of seat 14. The opposite end of link 34 is provided with a roller 44 arranged for linear displacement in a track 46 which may be carried by the top platform or support 20. The other link 36 is pivotally connected at one end to a stationary support block 48 carried by housing 20. The opposite end of link 36 is provided with a roller 50 arranged for linear displacement in a track 52 carried by the bottom platform or support 24. By such construction, seat 14 is provided with a substantial vertical range of movement.

Damper means 28 provides a cushioned travel for the seat 14. Many forms of mechanisms may be used in combination with the pivotal linkage means 26 to cushion the travel of the seat 14. That is, an air operated mechanism which responds to a fluid flow thereto could be used to provide a cushioned range of travel for seat 14. In the present embodiment, an air/oil damper mechanism is preferred to cushion the travel of seat 14. As illustrated, the damper mechanism 28 includes, in combination, a fluid driver or motor 54 and an air/oil accumulator 56 which are joind in fluid communication through a valve 57.

In its presently preferred form, the fluid driver 54 is in the nature of a single-acting fluid ram, and includes a cylinder housing 60 having a fluidically responsive piston 62 reciprocally arranged therein. Piston 62 effectively divides housing into at least two chambers 64 and 66. A valve housing 68, having flow valve 57 and a flow valve assembly 58 provide therein, is connectable to a source of fluid pressure through an inlet conduit 70. Flow valve 57 regulates the cushionable "feel" of seat 14 by regulating fluid flow between driver 54 and accumulator 56. Flow valve assembly 58 regulates the inlet fluid flow from conduit 70 to fluid driver 54 and, as will be subsequently described, positions seat 14 to a position midpoint of its travel. An outlet fluid conduit 67 (FIG. 2) leads from valve housing 68.

As illustrated, the linear position of piston 62 influences the position or height of seat 14. To effect this end, piston 62 is provided with a stem portion 74 which extends beyond housing 60. At its free end, stem 74 is provided with a drive roller 76 which operates in combination with a cammed member 78 to control the height of seat 14. As best illustrated in FIG. 1, member 78 includes a cammed surface portion 80 which engages with drive roller 76. The weight of the seat assembly maintains drive roller 76 and cam surface portion 80 in engagement. Cammed member 78 moves in unison with the pivotal linkage 26 through shaft 42. As such, linear extension and retraction of drive roller 76 in response to the fluid forces acting against piston 62 will result in angular displacement of cammed member 76 in a manner influencing the position of seat 14.

As mentioned above, operability of flow valve assembly 58 governs the midpoint position of seat 14. To effect this end, one end of an endwise movable link 82 is connected to drive roller 76. The other end of link 82 is connected to an arm 84 whose angular disposition controls fluid flow through the valve assembly 58. By such construction, the linear position of roller 76 is sensed by the valve assembly such that the seat 14 is adjusted to a midpoint position of its available travel.

The seat assembly 10 is responsive to a fluid flow to the seat suspension mechanism 16. When fluid flow to the seat suspension mechanism 16 is interrupted, the seat 14 normally lowers to its extreme lowest position of adjustment and suspension stroke. This feature permits use of the full stroke of the suspension mechanism during operation over rough terrain. In previous seat constructions of this nature, however, the operator usually would find the seat to be in a too low position for operation upon reentering the cab after fluid pressure had bled from the suspension mechanism. As such, the automatic seat stop mechanism 18 is provided to limit the range of downward movement of seat 14 upon interruption of fluid flow to the suspension mechanism 16.

The seat stop means 18 includes a driver 86, preferably in the form of a single-acting fluid ram, which is connected to the seat suspension mechanism and is fluidically responsive to the fluid flow thereto. As illustrated in FIG. 5, the driver 86 includes a cylinder housing 88 carried by platform 24 and a piston 90 arranged for reciprocal movement in the housing 88. Piston 90 effectively divides housing into chambers 92 and 94. Chamber 92 is fluidically connected to the suspension mechanism 16 through a conduit 96. More specifically, conduit 96 receives fluids passing to the suspension mechanism 16 through supply conduit 70 (FIGS. 1 and 2) and delivers same to chamber 92 through radial port 98. Chamber 94 of the driver 86 accommodates a resilient member 100 in the form of a compression spring. Spring 100 serves to move piston in a direction opposite to the fluid forces acting thereagainst it.

Returning to FIGS. 3 and 4, the seat stop mechanism 18 further includes a limit stop 102. Limit stop 102 might take any of a variety of forms. In the preferred embodiment, limit stop 102 includes a stepped member 104 having a stopping surface 106. The limit stop 102 is connected to the free end of a stem 108 extending beyond housing 88 from piston 90. Through movement of piston 90, limit stop 102 is movable into and out of the predetermined path of the linkage assembly 26 for preventing travel of the seat 14 below a predetermined level. In the illustrated embodiment, limit stop 102 is movable into and out of the path of the linkage pivot 38.

In operation, fluid flow from a pressurized source of fluid is delivered through conduit 70 to the seat suspension mechanism 16. As a result, fluid is delivered to one side of piston 62 in a manner linearly distending drive roller 76. As seen in FIG. 1, linear distension of drive roller 76 away from cylinder housing 60 causes cam 80 to ride on roller 76 resulting in angular displacement of cammed member 78. Angular displacement of member 78 likewise causes angular displacement of the pivotal linkage assembly 26. As a result, seat 20 is raised.

As drive roller 76 is linearly extended, arm or link 82 follows therewith. Linear displacement of the arm 82 correspondingly effects the flow through valve 58 to piston chamber 66 in a manner adjusting the seat to approximately midpoint of its travel. Thereafter, the accumulator 56 and driver 54 cooperate to provide a cushioned range of movement for the seat 14.

Concurrently, fluid is delivered to the seat stop mechanism 18. The fluid delivered to mechanism 18 overcomes the spring force of the resilient member 100 and causes distension of stem 108. As seen in FIG. 3, the distension of piston stem 108 results in displacement of the limit stop 102 away from the suspension system such that the pivotal linkage assembly 26 and the seat 14 carried thereby may operate through the full range of its travel.

When fluid flow to the suspension system is interrupted or stopped, the weight acting on cammed member 78 displaces drive roller 76 and seat 14 lowers. Interruption or cessation of fluid flow also effects driver 86 of the seat stop mechanism 18. Interruption or cessation of fluid flow to driver 86 permits the resilient member 100 to displace piston 90 and thereby automatically move the limit stop 102 into the path of movement of the linkage assembly 26. As illustrated in FIG. 4, when the piston is retracted, the limit stop 102 is moved into the path of the linkage assembly under the seat suspension pivot 38 such that it stops the seat from moving to its lowermost suspension position.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

We claim:

1. A seat assembly for an agricultural tractor comprising:
   a fluid activated seat suspension mechanism movable along a predetermined path for providing a vertical range of cushioned travel to a seat when said suspension mechanism is pressurized; and
   a seat stop having a stopping surface which is movable into the predetermined path of said suspension mechanism for automatically preventing the seat from traveling beneath a predetermined height level in the event the pressure of said suspension mechanism falls below a predetermined level.

2. The seat assembly of claim 1 wherein said seat suspension mechanism includes linkage movable along a predetermined path for connecting said seat to said tractor.

3. The seat assembly of claim 2 wherein said linkage includes at least one pair of links movable along a predetermined path and connectable in a scissor-like manner intermediate their ends.

4. A seat assembly for an agricultural tractor comprising:
   a seat suspension mechanism providing a vertical range of cushioned travel to a seat when fluid is supplied to the mechanism, said seat suspension mechanism includes linkage movable along a predetermined path for connecting said seat to said tractor; and
   a seat stop for automatically preventing the seat from traveling beneath a predetermined height level upon interruption of supply fluid to said mechanism, said seat stop includes means movable into the predetermined path of said linkage for limiting movement of said linkage beyond a predetermined limit.

5. The seat assembly of claim 4 wherein said limiting means includes a driver which is connected to said seat suspension mechanism and is fluidically responsive to the fluid flow to the seat suspension mechanism.

6. A seat assembly for an implement comprising:
   seat supporting mechanism for connecting an operator's seat to the implement while permitting reciprocal movement thereof along a substantially vertical path, said supporting mechanism includes pivotable linkage means comprising at least one pair of links which are interconnected in a scissor-like manner intermediate their ends and movable through a predetermined path for connecting said operator's seat to the implement;
   operative means associated with said seat supporting mechanism for providing a range of cushioned travel for said operator's in response to a flow of fluid to said operative means; and
   seat stop means connectable to said operative means for limiting the range of movement of said operator's seat upon an interruption in the fluid flow to said operative means, said seat stop means includes means movable into the predetermined path of said linkage means for preventing travel of said seat below a predetermined limit.

7. The seat assembly of claim 6 wherein said seat travel prevention means includes a driver whose operation is dependent upon fluid flow to said operative means.

* * * * *